(12) United States Patent
Sanderson (10) Patent No.: US 11,230,237 B1
(45) Date of Patent: Jan. 25, 2022

(54) VEHICLE TOOLBOX

(71) Applicant: Darrell Sanderson, Frankfort, KY (US)

(72) Inventor: Darrell Sanderson, Frankfort, KY (US)

( * ) Notice: Subject to any disclaimer, the term of this patent is extended or adjusted under 35 U.S.C. 154(b) by 0 days.

(21) Appl. No.: 16/841,914

(22) Filed: Apr. 7, 2020

(51) Int. Cl.
*B60R 11/06* (2006.01)
*B25H 5/00* (2006.01)
*B65D 25/04* (2006.01)
*B60R 11/00* (2006.01)

(52) U.S. Cl.
CPC ............ *B60R 11/06* (2013.01); *B25H 5/00* (2013.01); *B65D 25/04* (2013.01); *B60R 2011/004* (2013.01)

(58) Field of Classification Search
CPC .. B60R 11/06; B60R 11/004; B60R 2011/004
USPC .................................................. 224/404, 403
See application file for complete search history.

(56) References Cited

U.S. PATENT DOCUMENTS

| | | | | | |
|---|---|---|---|---|---|
| 4,789,195 | A * | 12/1988 | Fletcher | ............ | B60R 11/06 224/404 |
| 4,830,242 | A * | 5/1989 | Painter | ............ | B60P 3/32 224/404 |
| 5,743,584 | A * | 4/1998 | Lance | ............ | B60R 11/06 224/403 |
| 5,890,614 | A * | 4/1999 | Dancyger | ............ | B65D 21/043 220/23.6 |
| 6,375,054 | B1 * | 4/2002 | Lance | ............ | B60P 3/14 224/404 |
| 6,547,506 | B1 * | 4/2003 | Jacob | ............ | B60P 1/5433 296/37.6 |
| 6,695,375 | B1 * | 2/2004 | May | ............ | B60R 9/00 224/281 |
| 8,814,246 | B2 * | 8/2014 | Weller | ............ | B62D 33/03 296/37.6 |
| 10,668,870 | B2 * | 6/2020 | Furniss | ............ | B60P 3/14 |
| 2002/0005687 | A1 * | 1/2002 | Corona | ............ | A47B 88/42 312/334.33 |
| 2011/0172815 | A1 * | 7/2011 | Kim | ............ | G07F 11/50 700/235 |
| 2021/0076823 | A1 * | 3/2021 | Conrad | ............ | A47B 88/975 |

* cited by examiner

*Primary Examiner* — Derek J Battisti
(74) *Attorney, Agent, or Firm* — Sanchelima & Associates, P.A.; Christian Sanchelima; Jesus Sanchelima (57) ABSTRACT

A vehicle toolbox including a housing assembly, a drawer assembly, a bucket assembly and a vehicle assembly is disclosed. The housing includes a housing into which a drawer of the drawer assembly is received and stored. The drawer includes rails and roller wheels that help to facilitate the retraction and expansion of the drawer from the housing. The drawer is separated into compartments to provide better organization to a user. The bucket assembly includes a removable bucket that includes bucket compartments for organizing of the tools as well. There is at least one removable container received within the removable bucket. The at least one removable container helps to provide additional organization. The removable bucket may be removed from the drawer and carried to a necessary location. The removable bucket maintains the tools organized and readily available to the user.

7 Claims, 8 Drawing Sheets

VEHICLE TOOLBOX

BACKGROUND OF THE INVENTION

1. Field of the Invention

The present invention relates to a vehicle toolbox and, more particularly, to a vehicle toolbox that includes multiple buckets for holding tools, parts and other miscellaneous items.

2. Description of the Related Art

Several designs for vehicle toolboxes have been designed in the past. None of them, however, include multiple detachable five-gallon buckets that can be carried to a job site and which hold tools, parts, and other miscellaneous items. The toolbox of the present invention helps a user to remain organized. Organization helps facilitate the job of the user as all tools and necessary items are easy to find. Further, the give gallon buckets of the present invention helps to keep all tools readily available to the user even while away from the toolbox. The present invention also helps to allow for tools and parts to be easily transported from one location to another, such as different job sites.

Applicant believes that a related reference corresponds to U.S. Pat. No. 6,375,054 for a vehicle mounted storage unit. Applicant believes that another related reference corresponds to U.S. Pat. No. 4,789,195 for a truck toolbox. None of these references, however, teach of detachable give gallon buckets that can be carried to a job site.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a vehicle toolbox that can be removably mounted to a vehicle.

It is another object of this invention to provide a vehicle toolbox that helps to keep tools and parts readily available and organized.

It is still another object of the present invention to provide a vehicle toolbox that allows for tools, parts and other miscellaneous items to be transported from one job site to the next.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Referring now to the drawings, where the present invention is generally referred to with numeral 10, it can be observed that it, a vehicle toolbox 10, basically includes a housing assembly 20, a drawer assembly 40, a bucket assembly 60 and a vehicle assembly 80.

There is often a need for a user U to transport tools 102 from one location to another, such as a job site. Once at the desired location there is often a need for user U to carry tools 102 that help facilitate completion of the necessary task or job. The present invention may help user U achieve both of those aforementioned necessities. Further, vehicle toolbox 10 may help user U to maintain tools 102 stored, organized and readily available. The present invention helps user U become more organized, safe and efficient while working.

Figure 1:
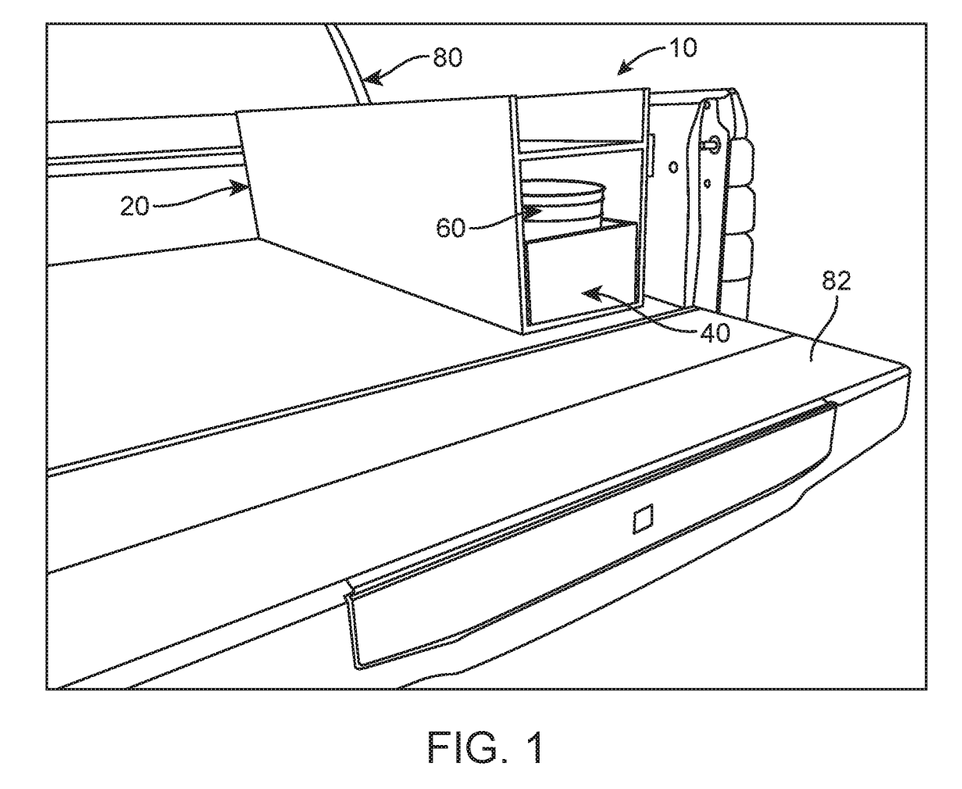
FIG. 1 represents an isometric view in which vehicle toolbox 10 is mounted to a vehicle 82.

It can be best seen in FIG. 1, that it may be preferable to mount and transport vehicle toolbox 10 on a vehicle 82 of vehicle assembly 80. The present invention may be removable from vehicle 82 and still be fully functional and operational without. It may be suitable for user U to maintain the present invention stationary. Vehicle 82 may preferably be a truck, but other vehicles may be suitable as well.

Figure 3:
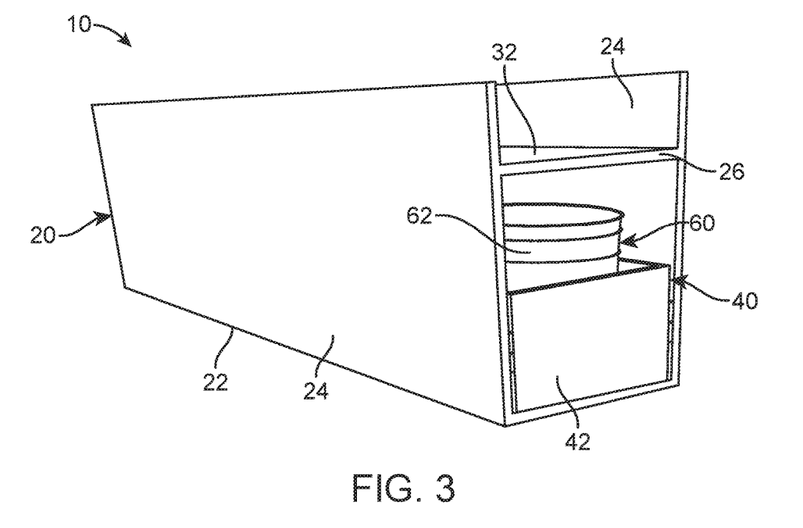
FIG. 3 illustrates an isometric view of housing 22 with drawer 42 retracted within.
Figure 4:
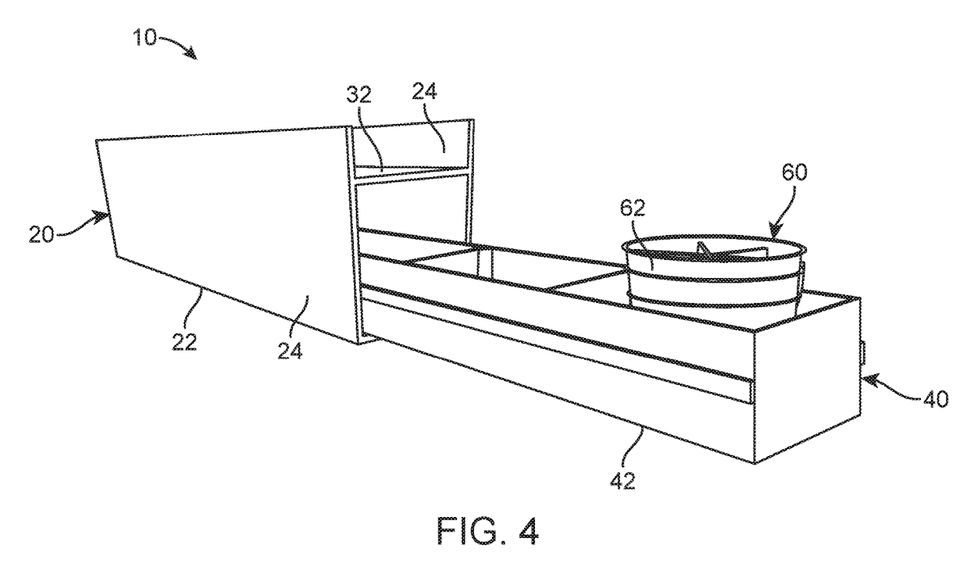
FIG. 4 is a representation of an isometric view of housing 22 with drawer 42 partially extended therefrom.
Figure 5:
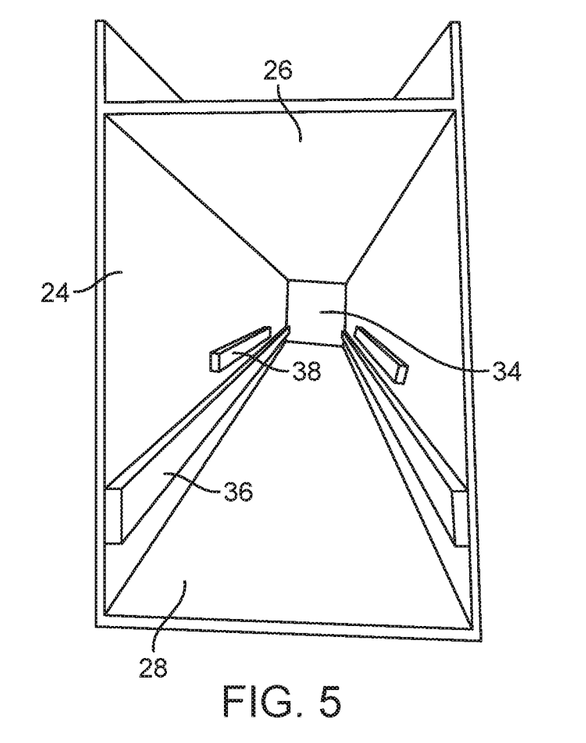
FIG. 5 represents an interior view of housing 22.

Housing assembly 20 as best seen in FIGS. 3-5 may include housing 22. Housing 22 may be of predetermined dimensions that cooperate with fitting within or on vehicle 82. Preferably, housing 22 may be of a rectangular shape. However, it is to be understood that other shapes may be suitable for housing 22. Housing 22 may be made of wood, in one embodiment. It may alternatively be suitable for housing 22 to be made metal, plastic, rubber, aluminum, metal, steel, or other similar materials.

Housing 22 may include sidewalls 24. Sidewalls 24 may extend a length of housing 22. Sidewalls 24 may be rectangular in shape. However, sidewalls 24 may also be any other shape that cooperates with the shape of housing 22. In the immediate embodiment, housing 22 may include two of sidewalls 24. Mounted at a predetermined height between sidewalls 24 may be a top portion 26. Top portion 26 may extend across a width and length of housing 22. It is to be understood that sidewalls 24 may extend a predetermined height above of top portion 26. Top portion 26 may provide a cover for drawer assembly 40 or other components housed beneath of top portion 26.

Top portion 26 may define a shelf 32 of the present invention. More specifically, shelf 32 may be defined as the area or spacing atop of top portion 26. Shelf 32 may be used to hold, store, or secure tools 102 thereon. Tools 102 may be readily accessible on shelf 32. Larger of tools 102 may be easily stored on shelf 32. In one embodiment, shelf 32 may be entirely open on a top face. It may also be suitable for shelf 32 to be entirely open on a front side and rear side. In an alternate embodiment, shelf 32 may include a wall extending across a width of shelf 32 on a front side, rear side or both. Sidewalls 24 may extend upwardly beyond shelf 32 on lateral sides thereof.

Housing 22 may further include a bottom portion 28. Bottom portion 28 may extend about the width and length of housing 22. It is to be understood that bottom portion 28 may be mounted in between sidewalls 24. It may be preferable for sidewalls 24, top portion 26 and bottom portion 28 to have a same length. Bottom portion 28 may be beneath of top portion 26. In the preferred embodiment, bottom portion may extend across the very bottom of housing 22 defining a housing floor. It may, however, be suitable for bottom portion 28 to be mounted at a predetermined height between sidewalls 24 and below top portion 26. Bottom portion 28 may provide support for drawer assembly 40 as drawer assembly 40 may be mounted onto bottom portion 28. Top portion 26 and bottom portion 28 may preferably be of a same shape and dimensions. It can be seen FIG. 5, that top portion 26 and bottom portion 28 may be parallel to each other. While both top portion 26 and bottom portion 28 may be perpendicular to sidewalls 24.

Housing 22 may have an interior in which drawer assembly 40 may be secured within. An opening 34 may lead to an interior of housing 22. Opening 34 may extend from a front to a rear of housing 22. Opening 34 may extend from a bottom edge of top portion 26 to a top edge of bottom portion 28. The interior of housing may be defined as the spacing between top portion 26 and bottom portion 28. It can be seen that at the interior of housing 22 may be a bottom rail support 36 and a top rail support 38. More specifically, bottom rail support 36 and top rail support 38 may be mounted to an inner side of each of sidewalls 24. Bottom rail support 36 and top rail support 38 may be mounted to sidewalls 24 with fastening members such as nails, screws, adhesives, snap buttons, welding or the like. Bottom rail support 36 and top rail support 38 may extend a predetermined length of each of sidewalls 24. Preferably, bottom rail support 36 may extend the entire length of sidewalls 24. Top rail support 38 may partially extend the length of sidewalls 24. It is to be understood that on each of sidewalls 24, bottom rail support 36 may be mounted below top rail support 38. There is to be a space defined between bottom rail support 36 and top rail support 38. Bottom rail support 36 may be parallel to top rail support 38. It is also to be understood that bottom rail support 36 and top rail support 38 on one of sidewalls 24 may be parallel to bottom rail support 36 and top rail support 38 on an opposite of sidewalls 24. It is to be understood that bottom rail support 36 and top rail support 38 may cooperate with drawer assembly 40.

Figure 6:
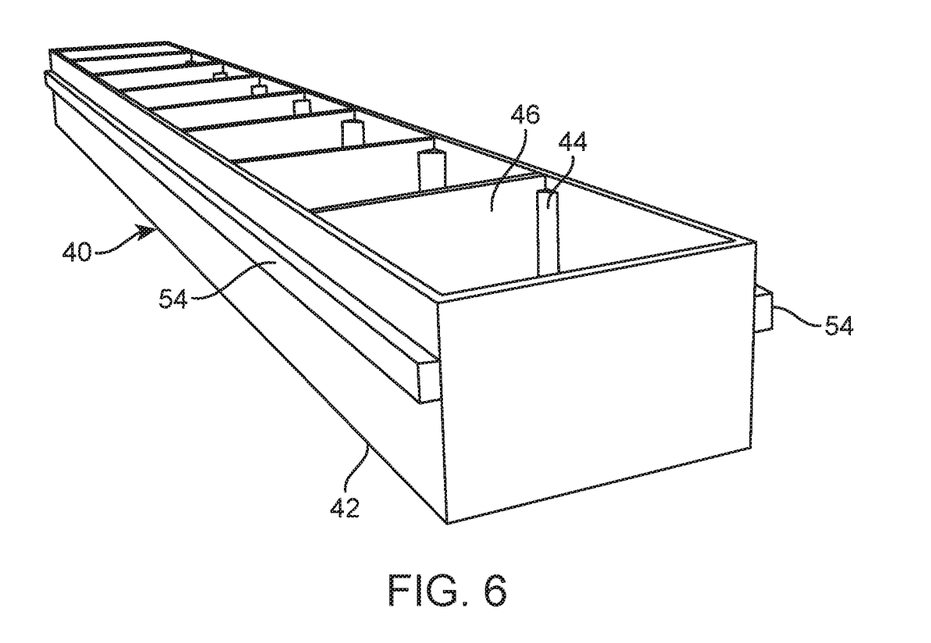
FIG. 6 shows an isometric view of the drawer 42.
Figure 6A:
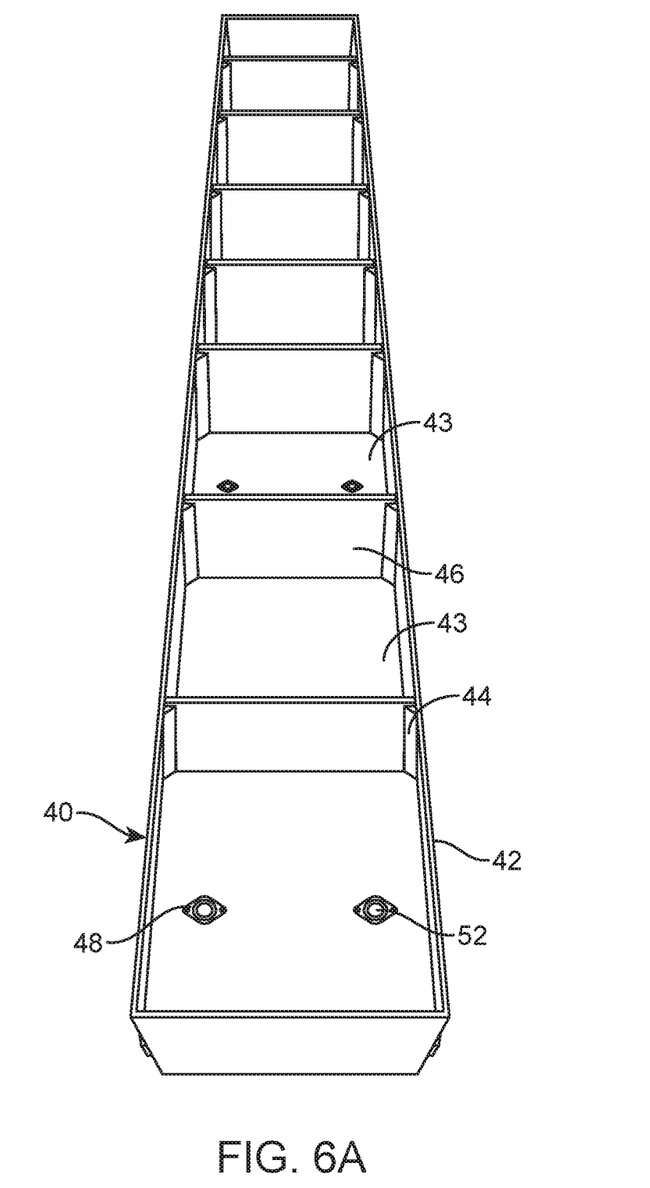
FIG. 6A shows an elevated top view of the drawer 42.
Figure 7:
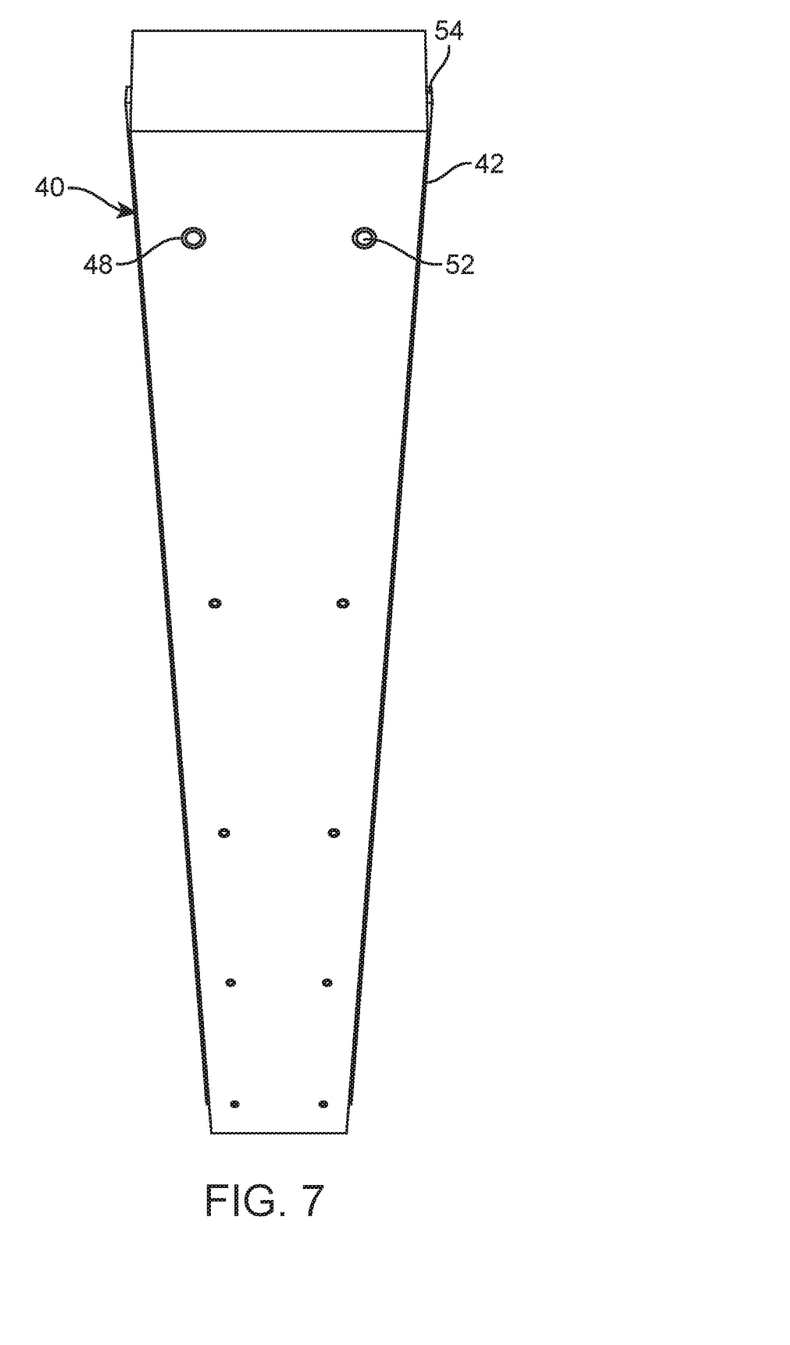
FIG. 7 illustrates a bottom view of the drawer 42.

It is to be understood that the present may include drawer assembly 40 as best seen in FIGS. 6-7. Drawer assembly 40 may be suitable to use alone, in one embodiment. However, preferably, housing assembly 20 and drawer assembly 40 are used together. Drawer assembly 40 may include a drawer 42. Drawer 42 may preferably be received by housing 22 between top portion 26 and bottom portion 28. Drawer 42 may be inserted into the interior of housing 22 through opening 34. It may be preferable for drawer 42 to be of a same length as housing 22. Drawer 42 may be of a shape that cooperates with housing 22. It may be suitable for drawer 42 to be rectangular and elongated in one embodiment. Drawer 42 may be of a height that extends only partially between the spacing between top portion 26 and bottom portion 28. Drawer 42 may be used to hold, store, carry or transport bucket assembly 60 and tools 102. Drawer 42 may preferably be made of similar materials as housing 22.

It may be suitable for drawer 42 to be separated into various compartments 43. The various compartments 43 help with keeping items within drawer 42 more organized. It may be suitable for drawer 42 to include at least one of compartments 43. Compartments 43 may be created with divider supports 44 and at least one drawer divider 46 as seen in FIG. 6. Preferably, divider supports 44 may be extend vertically along an inner side of the sidewalls of drawer 42. Divider supports 44 may be mounted within drawer 42 with fastening members. Divider supports 44 may extending partially along a height of drawer 42. It can be seen that in one embodiment, divider supports 44 may have a substantially triangular shape. It may be suitable to mount two of divider supports 44 to each of the drawer sidewalls for each of at least one drawer divider 46. That is to mean that each of at least one drawer divider 46 may be supported by four of divider supports 44 or two of divider supports 44 on each of a left and right side. Divider supports 44 on a same side may be evenly spaced and create a divider spacing therebetween. Divider supports 44 may be parallel to one another at all times. It can be seen that each at least one drawer divider 46 may be slid in-between divider supports 44. Each of at least one drawer divider 46 may extend above of drawer supports 44, in one embodiment. More of compartments 43 may be possible by using more of at least one drawer divider 46. It is to be understood that in the preferred embodiment, it may be suitable for compartments 43 to be of equal shape and dimensions. However, in an alternate embodiment, it may be suitable for compartments 43 to be of different and various shapes and dimensions. Compartments 43 may be of different dimensions to cooperate with tools 102 of different dimensions.

It is to be understood that drawer 42 may retract and extend from housing 22. Drawer assembly 40 may further include roller supports 48, roller wheels 52, and rails 54 to facilitate the movement of drawer 42 in and out from housing 22. Roller supports 48 may be mounted at predetermined locations along a floor of drawer 42. Roller supports 48 may be visible from the top surface and the bottom surface of the floor of drawer 42. Roller supports 48 may preferably be in mounted to drawer 42 in pairs. Roller supports 48 may be of a predetermined shape. It can be seen that centrally mounted to each of roller supports 48 may be one of roller wheels 52. It may be suitable for roller wheels 52 to be flush with roller supports 48 on a top surface of drawer 42. However, on a bottom surface of drawer 42 roller wheels 52 may protrude outwardly from drawer 42 as best seen in FIG. 7. Roller wheels 52 may facilitate the movement of drawer 42 along bottom portion 28. Roller wheels 52 may assist drawer 42 from being extended or retracted from housing 22. Drawer 42 may be easily slid, pushed, pulled or otherwise maneuvered due to roller wheels 52. It is to be understood that roller wheels 52 may preferably be spherical in shape. Rails 54 may also help to facilitate the movement of drawer 42 in and out of housing 22. Rails 54 may be mounted at predetermined locations to the outer side of the lateral sidewalls of drawer 42. Rails 54 may preferably extend the length of the drawer 42. Rails 54 may be secured to drawer 42 with fastening members such as screws, nails or other similar means. It is be understood that rails 54 may be received directly atop of bottom rail support 36 once drawer 42 is received within housing 22. It is to be understood that top rail support 38 may be atop of rails 54 when drawer 42 is within housing 22. That is due to rails 54 being received in between the spacing between bottom rail support 36 and top rail support 38. Bottom rail support 36 and top rail support 38 guide rails 54 within housing 22.

Figure 8:
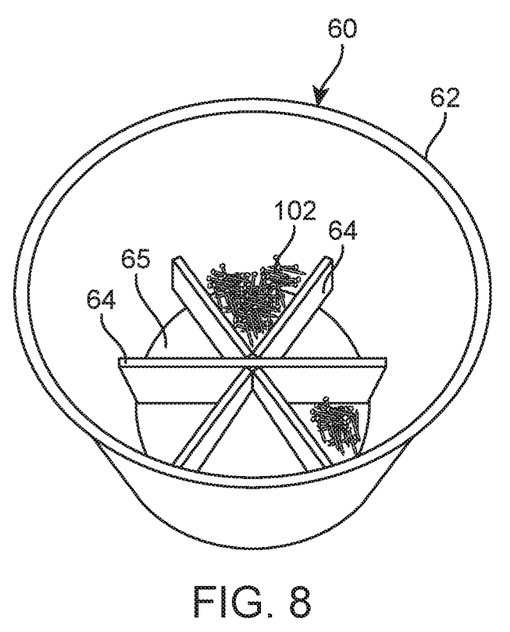
FIG. 8 is a representation of an elevated top view of the removable bucket 62 showing an interior thereof.
Figure 9:
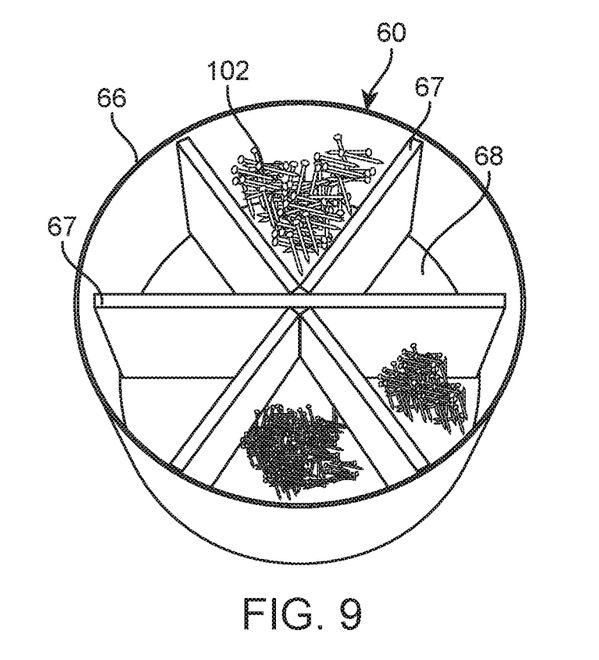
FIG. 9 represents an elevated top view of at least one removable container 46.
Figure 10:
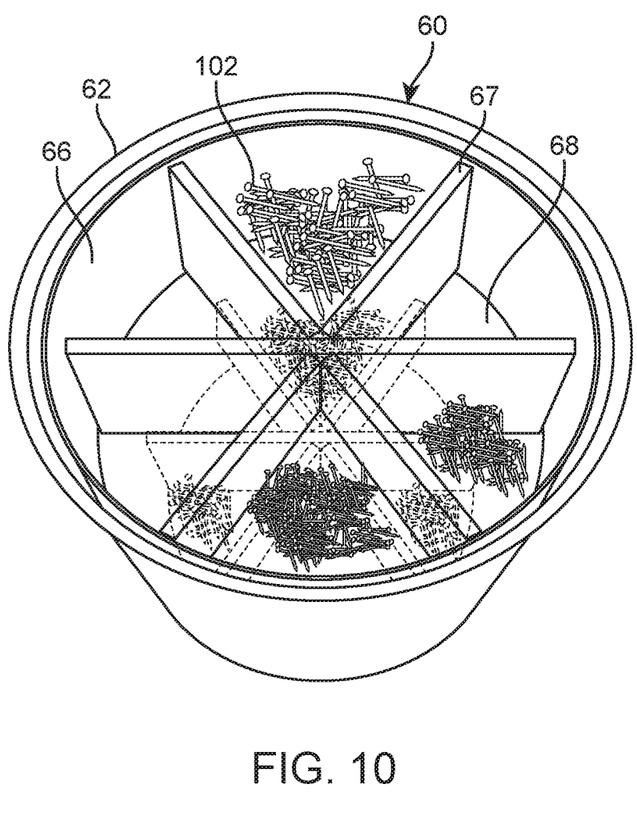
FIG. 10 shows an elevated top view of at least one removable container 46 within removable bucket 62.

Importantly, vehicle toolbox 10 includes bucket assembly 60. Bucket assembly 60 may be removable or detachable. It can be best seen in FIGS. 8-10 that bucket assembly 60 includes a removable bucket 62. It is to be understood that it may be suitable for the present invention to include multiple of removable bucket 62. Removable bucket 62 may be used to organize, store and transport tools 102. Removable bucket 62 may be received and held within drawer 42 or one of compartments 43. Removable bucket 62 may alternatively be referred to as a detachable five-gallon bucket. The present invention may include at least one of removable bucket 62. Removable bucket 62 may have a cylindrical shape, in one embodiment. It is to be understood that removable bucket 62 may be open on a top bucket face and closed on a bottom bucket face. Inside of removable bucket 62 may be bucket dividers 64. Bucket dividers 64 may be mounted onto a bucket floor of removable bucket 62. Bucket dividers 64 may further be defined as a long divider and short dividers. The long divider may extend the diameter of removable bucket 62. While the short dividers may extend a radius of removable bucket 62. Bucket dividers 64 may interconnect centrally on removable bucket 62. Bucket dividers 64 may have a star or star like configuration within removable bucket 62. Bucket dividers 64 may create bucket compartments 65 within removable bucket 62. In one embodiment, bucket dividers 64 may have a rectangular shape. However, other shapes may be suitable for bucket dividers 64. It is to be understood that bucket dividers 64 may be of dimensions that cooperate with fitting within removable bucket 62. Bucket dividers 64 may further provide support for at least one removable container 66.

Figure 2:
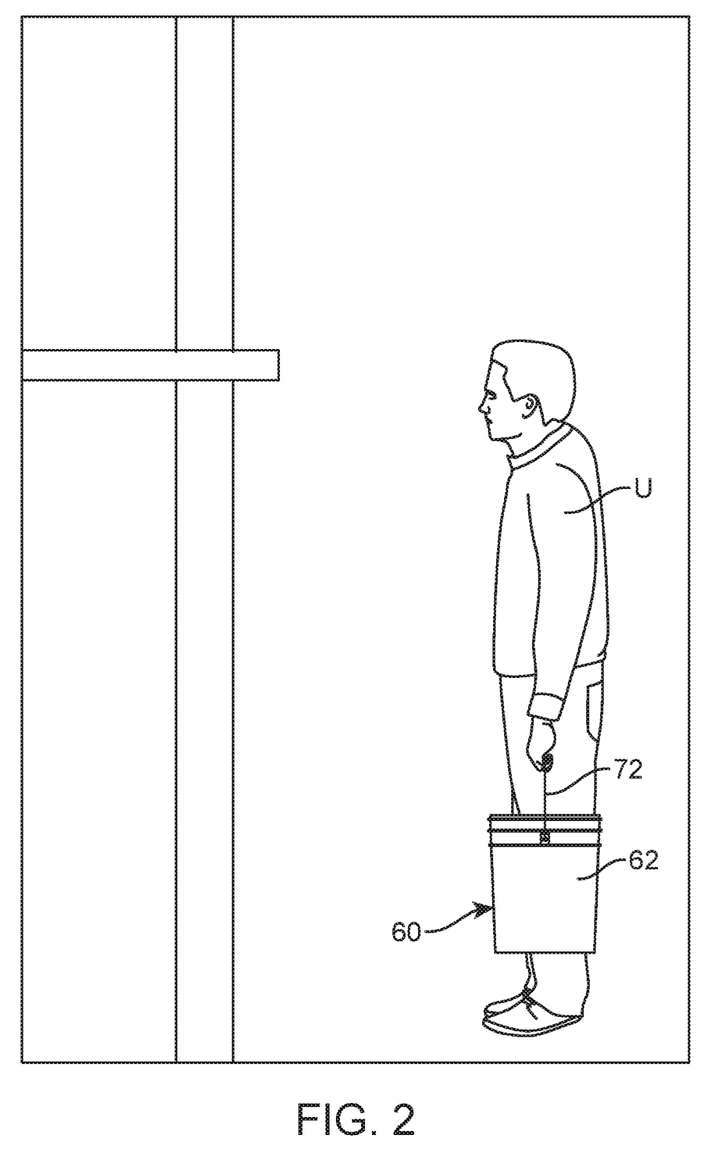
FIG. 2 shows an operational setting in which a user U is carrying one of removable buckets 62 to a job site.

One of at least one removable container 66 may be mounted atop of bucket dividers 64. Each of at least one removable container 66 may organize, store and transport tools 102 such as equipment or fasteners. Each of at least one removable container 66 may preferably be of a cylindrical shape. At least one removable container 66 may have an open top face and a closed bottom face. At least one removable container 66 may preferably be of dimensions that permit at least one removable container 66 to be received within removable bucket 62. Similar to removable bucket 62 with bucket dividers 64, each of at least one removable container 66 may include container dividers 67. Container dividers 67 may have a same purpose and function as bucket dividers 64. Typically, container dividers 67 may be of lesser dimensions than bucket dividers 64. Container dividers 67 may create container compartments 68 to hold and store tools 102 such as equipment, parts or other items as necessary by user. Bucket compartments 65 and container compartments 68 may be similar in function and purpose. It is to be understood that in the immediate embodiment, it may be suitable to store two of at least one removable container 66 within removable bucket 62. Other number of at least one removable container 66 may be received within removable bucket 62 depending on the dimensions of removable bucket 62. There may be multiples of at least one removable container 66 stacked atop of one another. Each of at least one removable container 66 may be easily removed from removable bucket 62. At least one removable container 66 may create multiple levels or tiers within removable bucket 62. It is to be understood that removable bucket 62 and at least one removable container 66 may maintain tools 102 and other necessary items readily available for user U. Removable bucket 62 may further include a handle 72 that may be used to easily carry and transport removable bucket 62 to a necessary location such as a job site, as best seen in FIG. 2. Handle 72 may be mounted over the opening of removable bucket 62. Handle 72 may be mounted about a perimeter of removable bucket 62. It may be suitable for handle 72 to swivel as well. In one embodiment, handle 72 may include a grip portion that provides comfort to user U that is carrying removable bucket 62.

The present invention may help to organize tools 102 such as equipment or parts. It may be suitable to mount the present invention to vehicle 82. The present invention includes a housing 22 that may receive a drawer 42 therein. Drawer 42 may include compartments 43 for the organize of tools 102. Within compartments may further be mounted removable bucket 62. Removable bucket 62 may be detached from drawer 42 and carried to the needed location to allow user U to have all needed items readily available. Within removable bucket 62 may be at least one removable container 66 to further organize items therein. User U is able to easily maintain all tools 102 and items organized and readily available with the present invention.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a vehicle toolbox, comprising:
   a. tools;
   b. a housing assembly including a housing, said housing having an opening that extends entirely therethrough, said housing mounted onto a vehicle, said housing including sidewalls, a top portion and a bottom portion, said bottom portion extending a housing width and a housing length, said bottom portion being parallel and beneath of said top portion, said opening defined as the spacing between said top portion and bottom portion, said sidewalls extend upwardly from the bottom portion of the housing to beyond the top portion of the housing defining a shelf configured to receive tools therein, said sidewalls including a bottom rail support and a top rail support on an interior of each of said sidewalls, said top rail support and said bottom rail support being parallel to each other, said bottom rail support and said top rail support have a rectangular shape, said bottom rail support extending entirely across said housing length, said bottom rail support being longer than said top rail support;
   c. a drawer assembly including a drawer, said drawer slidably received within said housing through said opening, said drawer including divider supports vertically along an interior of drawer sidewalls, said divider supports extend upwardly from a bottom drawer to a top of the drawer, at least one drawer divider extending between divider supports, said at least one drawer divider defining compartments, said compartments are configured to receive said tools therewithin, said at least one drawer divider extending above of said divider supports, said divider supports have a shape of a right triangle to fit into a right angle defined between at least one drawer divider and the drawer sidewalls, said drawer further including roller supports along the drawer bottom, said roller supports being parallel to each other, said roller supports are located on a middle portion of a bottom of each of the compartments, roller wheels being received within said roller supports, said roller supports facilitating the sliding of drawer in and out of said housing, said drawer further including rails along lateral exterior sides of said drawer, said rails extending entirely across a drawer length, said rails received between said bottom rail support and said top rail support, said rails, said top rail support and said bottom rail support being parallel to each other; and d. a bucket assembly including a removable bucket, said removable bucket received and held within said drawer, said removable bucket including bucket dividers within said removable bucket, said bucket dividers extending across a diameter of said removable bucket on a bottom of said removable bucket, said bucket dividers extend upwardly from the bottom of the removable bucket to a middle portion of the removable bucket, said middle portion defines a lower bucket portion and an upper bucket, said bucket dividers defining bucket compartments between said bucket dividers, said bucket compartments are configured to receive said tools therewithin, said lower bucket portion having the bucket compartments therebetween, said upper bucket portion being entirely hollow to receive at least one removable container therewithin, said at least one removable container has a same height as the upper bucket portion, said at least one removable container including container dividers which extend a container diameter of said at least one removable container, said container dividers defining container compartments between said container dividers, additional of said tools stored within said container compartments, one of said at least one removable container mounted atop of said bucket dividers within said removable bucket, additional of said at least one removable container stacked atop of one another, said removable bucket further including a handle, said handle allowing a user to carry said removable bucket.

2. The system of claim 1, wherein said removable bucket extends above of said drawer, said removable bucket partially visible within said drawer.

3. The system of claim 1, wherein said bottom portion extends a width and a length of said housing, said bottom portion defining a housing floor.

4. The system of claim 3, wherein said drawer is received atop of said bottom portion.

5. The system of claim 3, said sidewalls extend vertically from said bottom portion, said sidewalls extending said length of said housing.

6. The system of claim 1, wherein said housing is made of wood.

7. A system for a vehicle toolbox, consisting of:
a. a vehicle assembly including a vehicle;
b. tools;
c. a housing assembly including a housing, said housing having an opening that extends entirely therethrough, said housing mounted onto said vehicle, said housing including sidewalls, a top portion and a bottom portion, said bottom portion extending a housing width and a housing length, said bottom portion being parallel and beneath of said top portion, said opening defined as the spacing between said top portion and bottom portion, said sidewalls extend upwardly from the bottom portion of the housing to beyond the top portion of the housing defining a shelf configured to receive tools therein, said sidewalls include a bottom rail support and a top rail support on an interior side of each of said sidewalls, said top rail support and said bottom rail support being parallel to each other, said bottom rail support and said top rail support have a rectangular shape, said bottom rail support extending entirely across said housing length, said bottom rail support being longer than said top rail support;

d. drawer assembly including a drawer, said drawer slidably received within said housing through said opening, said drawer including divider supports vertically along an interior of drawer sidewalls, said divider supports extend upwardly from a bottom drawer to a top of the drawer, at least one drawer divider extending between divider supports, said at least one drawer divider defining compartments, said compartments are configured to receive said tools therewithin, said at least one drawer divider extending above of said divider supports, said divider supports have a shape of a right triangle to fit into a right angle defined between at least one drawer divider and the drawer sidewalls, said drawer further including roller supports along the drawer bottom, said roller supports being parallel to each other, said roller supports are located on a middle portion of a bottom of each of the compartments, roller wheels being received within said roller supports, said roller supports facilitating the sliding of drawer in and out of said housing, said drawer further including rails along lateral exterior sides of said drawer, said rails extending entirely across a drawer length, said rails received between said bottom rail support and said top rail support, said rails, said top rail support and said bottom rail support being parallel to each other; and e. a bucket assembly including a removable bucket, said removable bucket received and held within one of said compartments, said removable bucket including bucket dividers within said removable bucket, said bucket dividers extending across a diameter of said removable bucket on a bottom of said removable bucket, said bucket dividers extend upwardly from the bottom of the removable bucket to a middle portion of the removable bucket, said middle portion defines a lower bucket portion and an upper bucket, said bucket dividers defining bucket compartments between said bucket dividers, said lower bucket portion having the bucket compartments therebetween, said upper bucket portion being entirely hollow to receive at least one removable container therewithin, said at least one removable container including container dividers which extend a container diameter of said at least one removable container, said container dividers defining container compartments between said container dividers, additional of said tools stored within said container compartments, one of said at least one removable container mounted atop of said bucket dividers within said removable bucket, additional of said at least one removable container stacked atop of one another, said removable bucket further including a handle, said handle allowing a user to carry said removable bucket, said bucket assembly including multiple of said removable bucket.

* * * * *